Figures 1, 2, 3, 4:
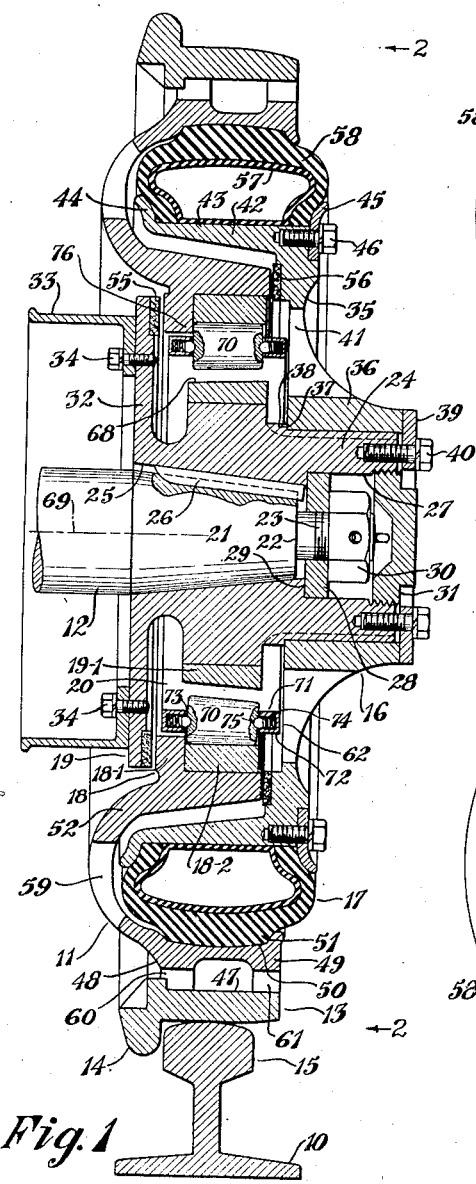

Oct. 16, 1934.  M. HOWALD  1,977,387

SELF CENTERABLE PNEUMATIC CUSHION RAIL WHEEL

Filed May 10, 1934  2 Sheets-Sheet 1

Inventor
M. Howald

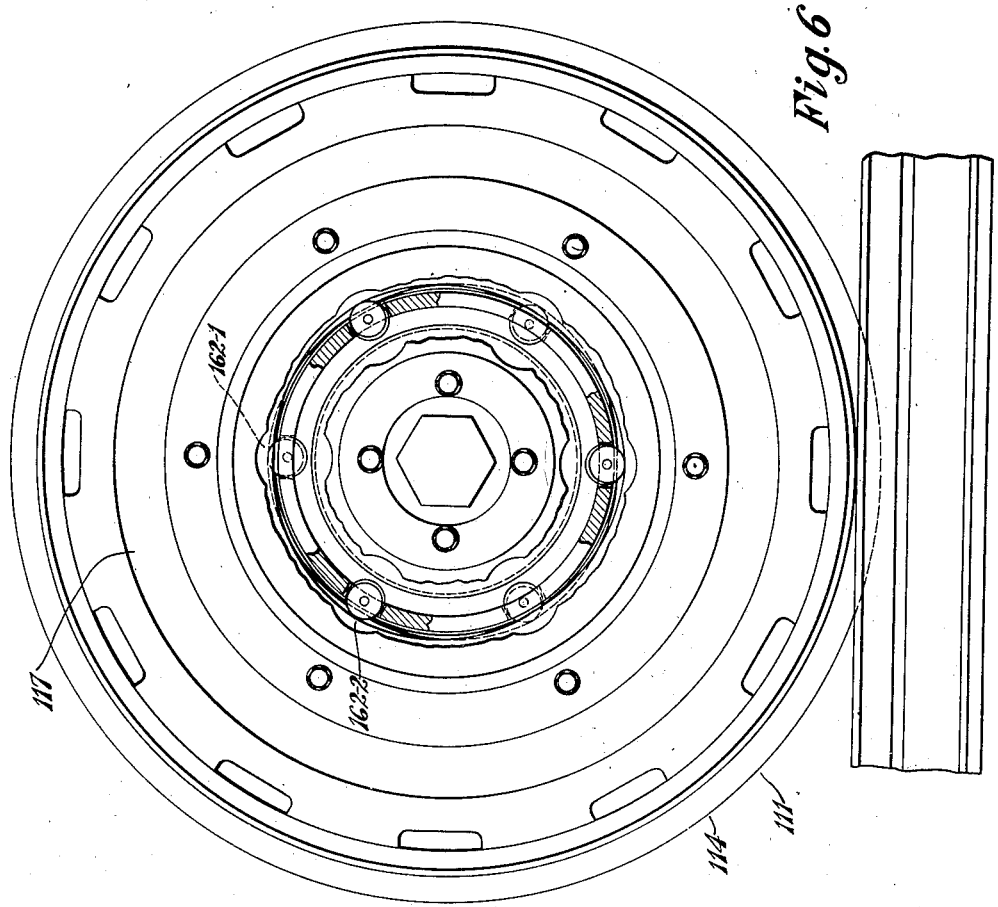
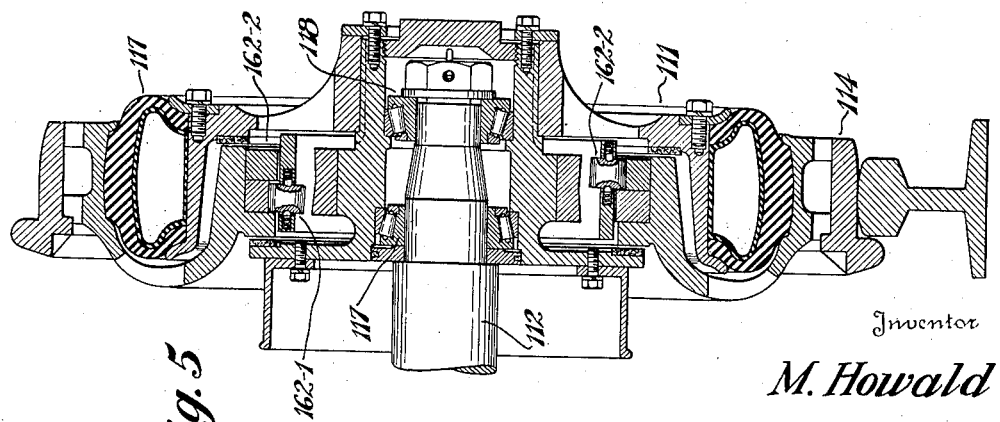

Patented Oct. 16, 1934

1,977,387

UNITED STATES PATENT OFFICE 1,977,387

SELF-CENTERABLE PNEUMATIC CUSHION RAIL WHEEL

Melville Howald, Massillon, Ohio, assignor of one-fourth to Wendell Herbruck, Canton, Ohio Application May 10, 1934, Serial No. 724,897

11 Claims. (Cl. 195—12)

My invention relates to pneumatic cushion rail wheels for use on railway cars, railway motor cars, and the like, the wheels rolling on the rails of a railway track system and always supporting proportionate parts of the load of the car, and sometimes driving the car and propelling any other cars which may be connected therewith as a train.

It has long been considered desirable to provide some form of cushion wheel for railway cars and railway motor cars and the like, to make such cars easier in their riding qualities, to better enable the attainment of high speeds, to facilitate the use of anti-friction bearings, and to minimize the transmission to the axles and other parts of the cars of vibrations and impact loads arising from the rolling of the wheels over track joints, switch frogs, cross-overs, and the like.

Resilient wheels including springs, solid rubber, and the like interposed between the wheel hubs and the wheel rims have proven unsatisfactory in most instances, because, among other things, of the crystallization and breaking of springs, and because of disintegration of the rubber under the heavy loads imposed thereon and the heat arising from the friction to which the solid rubber is subjected in the use of such wheels.

Various types of pneumatic cushion rail wheels have also been proposed including pneumatic cushion tires similar to automobile tires, but the pneumatic cushion rail wheels of which I am aware prior to the present improvements and the improvements set forth in my application for U. S. Letters Patent for Pneumatic cushion rail wheels, filed February 24, 1934, Serial No. 712,786, have been unsatisfactory in use because of the lack of any, or inadequate, provisions for properly supporting the axles and the car, when the pneumatic cushion tires blew out, and also because in many instances the rubber treads of usual pneumatic cushion rail wheels have rolled directly on the rails, with consequent very short life, and with relative low load sustaining capacity, and with insufficient capacity to sustain the thrust loads set up in the wheels when the car turns curves in the tracks.

The foregoing indicates some of the difficulties which are incident to all usual pneumatic cushion rail wheels of which I am aware prior to the present improvements and the improvements set forth in my application for U. S. Letters Patent for Pneumatic cushion rail wheels, filed February 24, 1934, Serial No. 712,786, whether the wheels be used as idlers, that is as mere rolling supports for the car, or as drivers, that is where the wheels are drive connected with axles and the axles are rotated by a motor for propulsion purposes; and in the case of driver pneumatic cushion rail wheels, a further difficulty is encountered because when the usual pneumatic tires blow out, proper drive of the wheel is impaired if not rendered impossible.

In general, common objects of the present improvements and of the improvements of my said prior application Serial No. 712,786, are to provide an improved pneumatic cushion rail wheel adapted for overcoming the foregoing difficulties.

Common particular objects of the present improvements and of the improvements of my said prior application Serial No. 712,786, are as follows:

First, to provide a pneumatic cushion rail wheel which is adapted for use either as an idler or a driver;

Second, to provide an improved construction and arrangement for a rail wheel including a pneumatic cushion tire and an improved metallic flanged annular rail band carried by the tire and rolling on the rail;

Third, to provide an improved pneumatic cushion rail wheel including a metallic annular rail band carried by a pneumatic cushion tire whose movements including up and down and side flexing are controlled;

Fourth, to provide a pneumatic cushion rail wheel adapted for setting up air circulation for preventing the tire thereof from overheating;

Fifth, to provide a pneumatic cushion rail wheel having a rigid metallic rail band, rigid metallic hub members, and a pneumatic cushion rubber tire interposed between the rigid metallic hub members and the rigid metallic rail band, the tire being normally inflated and maintaining the rail band and hub parts in yielding load sustaining relationship with each other, and the rail band and hub members are operatively associated so that when the tire deflects by excessive deflation beyond a predetermined degree the inner hub members will be supported in load sustaining relationship with the rail band; and

Sixth, to provide a pneumatic cushion rail wheel having an outer metallic rail band, inner hub members, and a pneumatic rubber tire interposed between the same, and in which there is a minimum relative rotary movement between the hub members, the tire and the rail band either when the tire is properly inflated or when the tire has been excessively deflated.

Further particular and specific objects of the present improvements, are as follows:

Seventh, to provide a metallic cushion rail wheel having an outer metallic rail band, inner hub members, and a pneumatic rubber tire interposed between the same, and the rail band and hub members being associated with each other and with other parts so as to support the hub members by rigid members on the rail band after a predetermined deflection of the tire; and Eighth, to provide a pneumatic cushion rail wheel having an outer metallic rail band, inner hub members, and a pneumatic rubber tire interposed between the same, and the rail band and hub members being associated with each other and with other parts so as to self-center the hub members on the rail band by rigid supporting members after a predetermined deflection of the tire.

The foregoing and other objects are attained by the improvements, apparatus, parts, combinations, and sub-combinations, which comprise the present invention, and the nature of which is set forth in the following general statement, and preferred embodiments of which, together with their mode of use, are set forth in the following description, and which are particularly and distinctly pointed out and set forth in the appended claims forming part hereof.

The nature of the improved self-centerable pneumatic cushion rail wheels of the present invention may be stated in general terms as including inner annular means, outer annular means, annular pneumatic means interposed between and engaging the inner and outer annular means, the pneumatic annular means being normally inflated with compressed air and maintaining the inner and outer annular means in yielding load sustaining relationship with each other, and self-actuating means including rigid members interposed between the inner annular means and the outer annular means and operative after a predetermined deflection of the pneumatic means to center the inner annular means and the outer annular means with respect to each other, and the rigid members serving to support the inner annular means on the outer annular means.

Preferred embodiments of the improved self-centerable pneumatic cushion rail wheels are illustrated in the accompanying drawings forming part hereof, in which Figure 1 is a vertical sectional view as on line 1—1, Fig. 2, of one embodiment of the improved self-centerable pneumatic cushion rail wheel of the present invention, the wheel being a driver wheel and being illustrated in position on a rail, and in supporting engagement with the axle of a railway car, other parts of the car not being shown, and the improved wheel including a pneumatic cushion tire in normally inflated position between inner and outer annular means, and the several parts of the wheel being illustrated in their several positions with such normal inflation of the tire;

Fig. 2, an outside elevation view of the wheel of Fig. 1, looking in the direction of the arrows 2—2, with portions broken away and illustrating the several parts of the wheel immediately after excessive deflection of the tire as by deflection, and before the self-centering operation of the wheel has taken place;

Fig. 3, a view similar to Fig. 2 illustrating the several parts of the wheel after the self-centering operation of the wheel has taken place;

Fig. 4, an enlarged view of portions of Fig. 3, with further parts broken away, and shown in section, and more clearly illustrating the self-centering apparatus of the wheel;

Fig. 5, a vertical sectional view, similar to the view of Fig. 1, illustrating another embodiment of the improved self-centerable pneumatic cushion rail wheel, in the form of an idler wheel, and including self-centering apparatus adapted to maintain the wheel in the same median plane of rotation after deflation of the tire; and Fig. 6, an outside elevation view of the wheel of Fig. 5 with portions broken away to more clearly illustrate the self-centering apparatus thereof.

Similar numerals refer to similar parts throughout the drawings.

In Figs. 1 to 3 inclusive, there is illustrated one rail 10 of a railway track, on which one embodiment of the improved self-centerable pneumatic cushion rail wheel of the present invention is in operative position and is indicated generally by 11 and is secured on the outer end of an axle 12 of a railway car, not otherwise shown.

The improved wheel 11 includes rigid outer annular means indicated generally by 13 and having an outer flanged rail band 14 whose outer peripheral surfaces are similar to the outer peripheral surfaces of a usual flanged railway car wheel, and which roll on and operate against the head flange 15 of the rail 10.

The improved wheel 11 furthermore includes inner supporting means indicated generally by 16 and which as illustrated constitute inner annular means, and which are secured on the outer end of the axle 12.

Yielding means, preferably annular pneumatic cushion tire means indicated generally by 17 are interposed between the outer annular means 13 and the inner annular means 16; and the pneumatic tire means 17 are normally inflated to a pressure so as to maintain the inner and outer annular means in yielding load sustaining relationship with each other, thus cushioning the axle and other parts supported by the wheel, as the wheel rolls along the track.

The outer annular means 13 also includes stop and cam means indicated generally by 18, which is preferably in the form of an annular stop member 18—1 including a cam ring 18—2, as illustrated; and the inner annular means 16 includes stop and cone means indicated generally by 19, and which are preferably in the form of outwardly opening U groove walls having a cone bottom ring 19—1; and the annular stop member 18—1 and its cam ring 18—2 of the outer annular means 13 are located in the groove space 20 of the groove wall stop and cone means 19; and the stop and cam means 18 and the groove wall stop and cone means 19 are normally spaced from each other when the tire 17 is normally inflated, as illustrated in Fig. 1.

In the embodiment 11 of the improved self-centerable pneumatic cushion rail wheel illustrated in connection with a railway car and the like in Figs. 1 to 3 inclusive, the car axle 12 has an outer frusto-conical tapered portion 21 whose minimum diameter is at its outer end 22 and the axle 12 terminates in a threaded end portion 23 whose diameter is less than the minimum diameter of the frusto-conical portion 21.

The inner annular means 16 includes a hub 24 having a bore including at its inner end a frusto-conical tapered portion 25 which fits and seats upon the frustro-conical tapered portion 21 of the axle 12 and key means indicated generally by 26 are interposed between the tapered portion 21 of the axle and the tapered portion 25 of the hub bore, and provide a driving connection between the axle and the wheel.

The bore of the hub 24 also includes at its outer end a counterbored socket 27 whose diameter is larger than the minimum diameter of the tapered portion of the hub bore, and a clamping ring 28 is located on the shank of the threaded end 23 of the axle 12, and abuts against the bottom seat 29 of the counterbored socket 27, and a nut 30 screwed on the threaded axle outer end 23 secures the wheel 11 in place on the axle 12.

An externally threaded closure 31 may be and preferably is provided and screwed into the internally threaded outer end of the counterbored socket 27.

The hub 24 furthermore includes at its inner side, a groove forming side wall 32; and a brake drum 33 may be and preferably is removably secured to the groove forming side wall 32 as by cap screws 34.

The inner annular means 16 furthermore include as illustrated an annular unit 35 having a hub portion 36 whose bore is internally splined and drive fitted upon externally splined outer end portions of the hub 24. The inner end 37 of the hub portion 36 of the unit 35 abuts against an annular side seat 38 formed externally on the hub 24, and a clamping ring 39 abuts against the outer end of the hub portion 36, and cap screw means 40 serve to clamp the ring 39 against the outer end of the hub portion 36 and secure the annular unit 35 in place on the hub 24.

The annular unit 35 also includes a web and groove forming side wall 41 which extends outwardly from the hub portion 36, and the annular unit 35 also includes as illustrated a rim forming outer annular flange 42.

The annular flange 42 includes an externally cylindric base portion 43 terminating at its inner end in an annular rim side rib 44.

At the outer end of the cylindric base portion 43, a removable annular rim side rib 45 is secured to the annular unit 35 as by cap screw means 46; and the cylindric rim base portion 43, the rim side rib 44, and the removable side rib 45 form a rim seat for the pneumatic cushion tire means 17.

The outer annular means 13 as aforesaid includes an externally flanged rail band 14 having an internal cylindric counterbored seat 47 which is shrunk upon externally cylindric faces of an annular tire band, stop, and cam unit 48 including an annular tire band 49 externally seating the rail band 14, and having an internal shallow annular tire seat channel 50 which seats the external annular tread 51 of the tire means 17.

The outer annular means 13 furthermore includes as aforesaid the annular stop and cam means 18, which is located in the outwardly opening U groove formed by the wall 32 of the hub 24, the wall 41 of the unit 35, and the cone ring 19—1; and the stop and cam means 18 is connected with the annular tire band 49 by an annular web wall 52 which curves about and is spaced from the inner side of the casing of the tire means 17 and the rim forming outer annular flange 42 of the annular unit; and the stop and cam means 18 is located within the base portion 43 of the flange 42, and the tire band 49 is located outside of the flange 42 and the tire 17, which as aforesaid is interposed between the rim seat on the annular unit 35 and the tire band 49 of the annular unit 48.

The inner faces of the groove forming walls 32 and 41 are preferably provided with side bearing rings 55 and 56 opposite the sides of the annular stop and cam means 18.

The pneumatic tire means 17 preferably includes an inner tube 57 and a casing 58 generally similar in construction to an automobile tire.

The outer annular means 13 is preferably made of metal such as steel, and by making the same preferably of steel, and also by the annular and transversely curved form of the same as illustrated, the outer annular means 13 is rigid, and maintains its shape with respect to its rotary action in use and under the loading conditions imposed thereon.

Similarly the inner annular means 16, with the exception of the preferably graphite impregnated bronze rings 55 and 56, is preferably made of steel parts, and by the use of this material and by conformation of the same as illustrated, the inner annular means 16 is rigid.

By the use of rigid inner and outer annular means 13 and 16, the life of the pneumatic cushion means 17 interposed therebetween is greatly extended, and relatively great loads may be safely carried by the wheel.

The side groove forming walls 32 and 41 with the preferred bearing rings 55 and 56 limit the side movement of the outer annular means 13, by reason of side flexing of the tire means 17 when the wheel rolls around a curve or the like, the sides of the annular stop and cam means 18 abutting respectively against the adjacent bearing ring 55 or 56.

The annular unit 48 of the outer annular means 13 has preferably formed therein ventilating openings 59 in the web 52, and also ventilating openings 60 and 61 in the outer flange legs of the preferably channel-shaped band 49.

The provision of the ventilating openings 59, 60, and 61 in the unit 48 provides for a cooling of the tire means 17.

The cam ring 18—2 of the outer annular means 13 and the cone ring 19—1 of the inner annular means 16 constitute with other parts about to be described, rotary locking apparatus, or more fully self-actuating centering and supporting means interposed between the outer annular means 13 and the inner annular means 16, and which is indicated generally by 62.

The rotary locking apparatus 62 is preferably structurally similar to the rotary engaging or locking apparatus set forth in my U. S. Letters Patent No. 1,850,970, issued March 22, 1932, the structure of the rotary locking apparatus 62 of the present improvements being modified to meet the particular requirements thereof.

The rotary locking apparatus or self-actuating means 62, includes as aforesaid an outer cam member or ring 18—2 which has formed on its inner periphery as illustrated six spaced raceway surfaces 63.

Each raceway surface 63 may be spiralled with respect to the center axis 64 of the preferably cylindric outer peripheral surface of the ring 18—2, which coincides with the center axis of the outer annular means 13; but in order to attain ease of manufacture each raceway surface 63 preferably consists of two portions of surfaces of revolution, each of which as illustrated is a cylinder whose axis is eccentric to the center axis 64 of the ring 18—2.

Each raceway surface 63 preferably extends from an element indicated at 65 in a radial plane indicated by the dot-dash line 66 extending through the center axis 64 in two eccentric portions symmetrical with respect to and on opposite sides of the radial plane 66, the outer ends of each raceway surface 63 terminating at junctions 67 with the outer ends of the adjacent raceway surfaces 63, and the raceway surfaces being equal in angular measure.

The inner member 19—1 of the rotary locking apparatus or self-actuating means 62 has formed on its outer periphery a raceway surface 68, and the raceway surface 68 is preferably a closed conical surface of revolution, the axis of which coincides with the axis of rotation of the axle 12, indicated by the dot-dash line 69.

Tapered or frusto-conical rolling members 70 are interposed between the continuous conical raceway surface 69 of the inner member 19—1 and the spaced eccentric raceway surfaces 63 of the outer member 18—2, one rolling member 70 being provided for each eccentric raceway surface 63.

Means indicated generally by 71 are provided for maintaining the rolling members 70 equally circumferentially spaced from each other.

The spacing means 71 as illustrated includes a ring cage 72 interposed between the outer member 18—2 and the inner member 19—1, and the ring cage 72 is provided with six equally spaced slots 73, and each tapered rolling member 70 is located in one of the slots 73.

Releasable spring pressed ball means indicated generally by 74 are preferably interposed between spherical depressions 75, provided one in each end of each rolling member 70, and adjacent portions of the ring cage 71, the spring pressed ball means 74 normally maintaining the rolling members 70 in inoperative positions illustrated in Fig. 1 in which the tire means 17 is normally inflated, and in which as illustrated no load is applied to the axle 12, so that the axis 69 of the axle 12 is concentric with the axis of rotation of the outer annular means 13.

The cam member 18—2, the cone member 19—1, and the tapered rolling members 70 are preferably made of steel of a similar character to that employed in tapered roller bearings, and under a no load condition as illustrated in Fig. 1, and under the condition of normal loading, with the tire 17 properly inflated, there is no contact between the rigid rolling members 70 and the cone member 19—1 included in the inner annular means 16.

After deflection of the tire beyond a predetermined limit, as by deflation or blow out, the axle 12, and the inner annular means 16 mounted thereon drops down so that the lower portions of the cone ring 19—1 rest upon the lower rigid rolling members 70 and are supported thereby on the lower cam surfaces 63 of the outer annular means 13.

Rotation of the wheel in either direction causes a slight relative rotary movement between the inner annular means 16 and the outer annular means 13, the cone ring 19—1 rolling on the rollers, and the rollers rolling on the cam surfaces and self-actuating to return the outer annular means 13 from its eccentric position with respect to the inner annular means 16 as shown in Fig. 2, to a concentric position as shown in Fig. 3, in which the inner annular means 16 is locked and supported in the outer annular means 13 by all the rolling members 70 wedged between one end of each of their respective raceway surfaces 63 and the conical surface 68 of the cone member 19—1.

The wheel 11 in the position of its relative parts shown in Fig. 3 may then be operated as a rigid mechanical wheel without any load whatsoever being imposed on the pneumatic tire means 17 until such time as the deflated tire means 17 may be repaired.

The end thrust of the rolling members 70 in the wheel 11 is taken by a thrust flange 76 on the annular stop member 18—1.

The embodiment 111 of the improved self-centerable pneumatic cushion rail wheel illustrated in connection with a railway car and the like in Figs. 5 and 6 is generally similar to the wheel 11, but is an idler wheel and is shown as mounted by anti-friction bearing means 177 and 178 on a stationary shaft 112.

The wheel 111 also includes two side by side rotary locking apparatuses or self-actuating means indicated generally by 162—1 and 162—2, each of which may be described as comprising a rotary locking apparatus similar to the apparatus 62, but having three rollers, and the rollers of the apparatus 162—1 being tapered oppositely from the taper of the rollers of the apparatus 162—2, and the rollers of each apparatus being staggered with respect to each other, and the conical raceways of the cone members of the apparatuses 162—1 and 162—2 being oppositely tapered so that the thrust reaction of the rollers thereof is in opposite directions and serves to maintain the rail band 114 in the same median plane of rotation, even after excessive deflation of the tire means 117 and supporting and centering operation of the locking apparatuses 162—1 and 162—2.

I claim:

1. A wheel including inner annular means, outer annular means, pneumatic means interposed between the inner and outer annular means, the pneumatic means being normally inflated and maintaining the inner and outer annular means in yielding load sustaining relationship with each other, and rotary engaging apparatus operatively interposed between the inner annular means and the outer annular means, the rotary engaging apparatus including an engaging member on the inner annular means, an engaging member on the outer annular means, there being one or more raceway surfaces formed on each engaging member, and rolling members interposed between the raceway surfaces, the rolling members being normally spaced from the raceway surface of one of the engaging members when the pneumatic means is normally inflated and being operative to engage the engaging members after a predetermined deflection of the pneumatic means.

2. A wheel including inner annular means, outer annular means, pneumatic means interposed between the inner and outer annular means, the pneumatic means being normally inflated and maintaining the inner and outer annular means in yielding load sustaining relationship with each other, and engaging apparatus operatively interposed between the inner annular means and the outer annular means, the engaging apparatus including an engaging member on the inner annular means, an engaging member on the outer annular means, and intermediate members interposed between the engaging members, the intermediate members being normally spaced from one of the engaging members when the pneumatic means is normally inflated and being operative to engage the engaging members after a predetermined deflection of the pneumatic means.

3. A wheel including inner annular means, outer annular means, pneumatic means interposed between the inner and outer annular means, the pneumatic means being normally inflated and maintaining the inner and outer annular means in yielding load sustaining relationship with each other, and rotary engaging apparatus operatively interposed between the inner annular means and the outer annular means, the rotary engaging apparatus including an engaging member on the inner annular means, an engaging member on the outer annular means, there being one or more raceway surfaces formed on each engaging member, and tapered rolling members interposed between the raceway surfaces, the tapered rolling members being normally spaced from the raceway surface of one of the engaging members when the pneumatic means is normally inflated and being operative to engage with the engaging members after a predetermined deflection of the pneumatic means.

4. A wheel including inner annular means, outer annular means, pneumatic means interposed between the inner and outer annular means, the pneumatic means being normally inflated and maintaining the inner and outer annular means in yielding load sustaining relationship with each other, and engaging apparatus operatively interposed between the inner annular means and the outer annular means, the engaging apparatus including an engaging member on the inner annular means, an engaging member on the outer annular means, and intermediate members interposed between the engaging members, the intermediate members being normally spaced from one of the engaging members when the pneumatic means is normally inflated and being operative to engage with the engaging members after a predetermined deflection of the pneumatic means and to move the inner annular means and the outer annular means into a position of concentricity with respect to each other.

5. A wheel including inner annular means, outer annular means, pneumatic means interposed between the inner and outer annular means, the pneumatic means being normally inflated and maintaining the inner and outer annular means in yielding load sustaining relationship with each other, and self-actuating means interposed between the inner annular means and the outer annular means and operative after a predetermined deflection of the pneumatic means to center the inner annular means and the outer annular means with respect to each other.

6. A wheel including inner annular means, outer annular means, pneumatic means interposed between the inner and outer annular means, the pneumatic means being normally inflated and maintaining the inner and outer annular means in yielding load sustaining relationship with each other, and self-actuating means including rigid members interposed between the inner annular means and the outer annular means and operative after a predetermined deflection of the pneumatic means to center the inner annular means and the outer annular means with respect to each other.

7. A wheel including inner rigid annular means, outer rigid annular means, pneumatic means interposed between the inner and outer rigid annular means, the pneumatic means being normally inflated and maintaining the inner and outer rigid annular means in yielding load sustaining relationship with each other, and self-actuating means interposed between the inner rigid annular means and the outer rigid annular means and operative after a predetermined deflection of the pneumatic means to center the inner rigid annular means and the outer rigid annular means with respect to each other.

8. A wheel including inner rigid annular means, outer rigid annular means, pneumatic means interposed between the inner and outer rigid annular means, the pneumatic means being normally inflated and maintaining the inner and outer rigid annular means in yielding load sustaining relationship with each other, and self-actuating means including rigid members interposed between the inner rigid annular means and the outer rigid annular means and operative after a predetermined deflection of the pneumatic means to center the inner rigid annular means and the outer rigid annular means with respect to each other.

9. In a railway car and the like, outer annular means adapted to roll on a track, an axle, inner supporting means on the axle, pneumatic means interposed between the inner supporting means and the outer annular means, the pneumatic means being normally inflated and maintaining the outer annular means and inner supporting means and axle in yielding load sustaining relationship with each other, and self-actuating means interposed between the inner supporting means and the outer annular means and operative after a predetermined deflection of the pneumatic means to center the outer annular means with respect to the axis of rotation of the axle.

10. A wheel including inner annular means, outer annular means, pneumatic means interposed between the inner and outer annular means, the pneumatic means being normally inflated and maintaining the inner and outer annular means in yielding load sustaining relationship with each other, and a pair of side by side rotary engaging apparatuses operatively interposed between the inner annular means and the outer annular means, each rotary engaging apparatus including an engaging member on the inner annular means, an engaging member on the outer annular means, there being one or more raceway surfaces formed on each engaging member, and tapered rolling members interposed between the raceway surfaces of each engaging apparatus, the rolling members of the one engaging apparatus being tapered oppositely with respect to the taper of the rolling members of the other engaging apparatus, and the tapered rolling members of each engaging apparatus being normally spaced from the raceway surface of one of its engaging members when the pneumatic means is normally inflated and being operative to engage with the engaging members after a predetermined deflection of the pneumatic means.

11. A wheel including inner annular means, outer annular means, pneumatic means interposed between the inner and outer annular means, the pneumatic means being normally inflated and maintaining the inner and outer annular means in yielding load sustaining relationship with each other, and a pair of side by side self-actuating apparatuses, each self-actuating apparatus being interposed between the inner annular means and the outer annular means and operative after a predetermined deflection of the pneumatic means to center the inner annular means and the outer annular means with respect to their axis of rotation and each of said self actuating apparatus to thrust react opposite the thrust reaction of the other self-actuating apparatus in directions parallel with the axis of rotation.

MELVILLE HOWALD.